Patented May 14, 1929.

1,713,412

UNITED STATES PATENT OFFICE.

HERMANN WINKEL, OF GOTTINGEN, GERMANY, ASSIGNOR TO THE FIRM R. WINKEL G. M. B. H., OF GOTTINGEN, GERMANY.

MICROSCOPE.

Application filed January 16, 1928, Serial No. 247,199½, and in Germany January 7, 1927.

The present invention relates to a microscope for meat inspection and the like, provided with a compressor, which consists of a glass plate, used as an object slide, and a second glass plate, used as a cover-plate.

Figure 1:
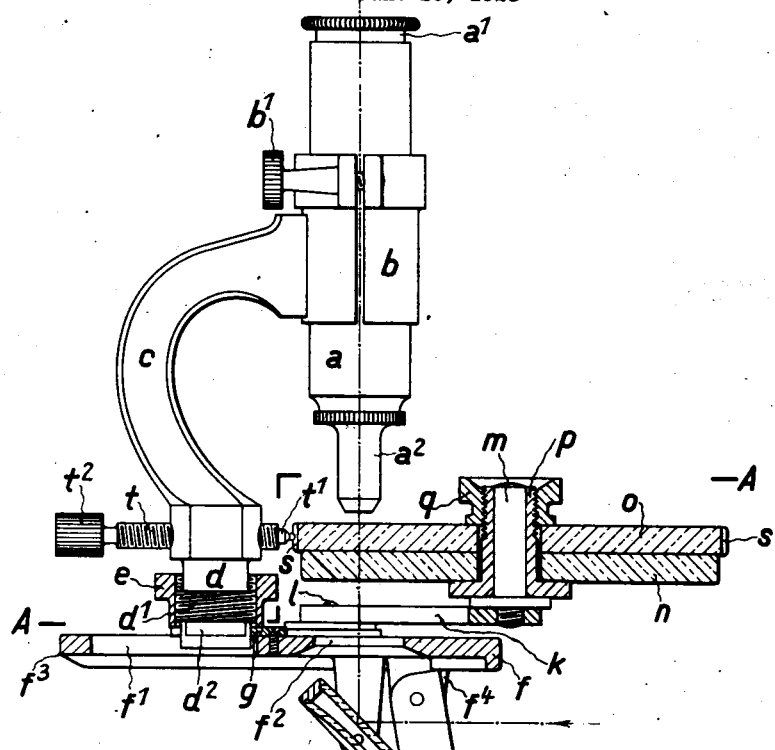
Figure 2:
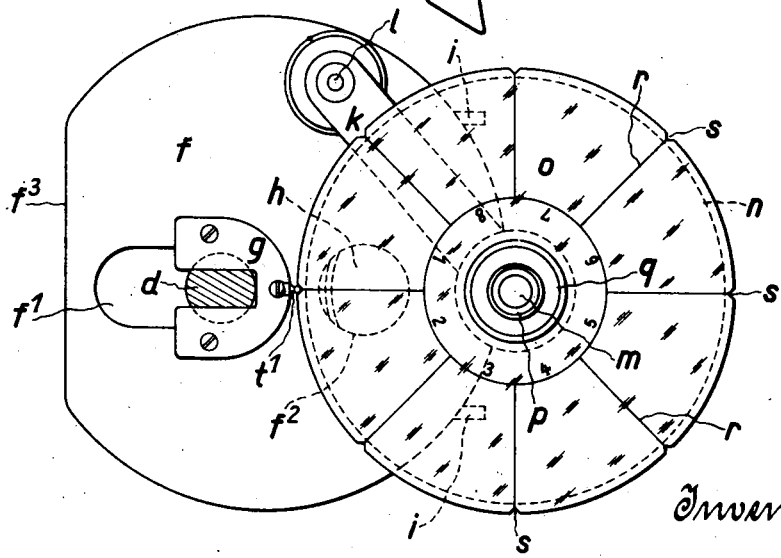

In the annexed drawing Fig. 1 shows a constructional example of the invention in an elevation, partly in a section, and Fig. 2 is a plan in a section on the line A—A of Fig. 1.

The microscope shown contains a tube $a$, which is fitted with an ocular $a^1$ and an objective $a^2$, and fixed in a clamping sleeve $b$ with the aid of a set-screw $b^1$. The clamping sleeve $b$ is fixed on a carrier $c$ which terminates at the bottom in a cylindrical bolt $d$. The latter is provided with a thread $d^1$ and closely below the same with two recesses $d^2$, opposite each other, and carries a nut $e$. It is used for fixing the carrier $c$ on a circular base plate $f$ in which there is a slot $f^1$ to the one end of which is screwed a U-shaped piece of sheet-metal $g$. A second circular opening $f^2$ of the base plate $f$ allows the illuminating rays to enter the objective $a^2$ from below. Underneath the opening $f^2$ there is disposed a swivelling microscope mirror $h$. The base plate $f$ is milled off along a chord of a circle $f^3$, perpendicular to the longitudinal direction of the slot $f^1$, and carries on the side opposite to this milled part two pedestals $f^4$ provided with foldable feet $i$. On the base plate $f$ is further supported a lever $k$, rotatable about an axis $l$ parallel to the tube axis $a$. This lever $k$ carries at its free end a bolt $m$ about which there is rotatable a compressor. The latter consists of a circular glass stage $n$ and a likewise circular glass-cover plate $o$, which are held together by means of a screw $p$ with a nut $q$. The cover-plate $o$ is provided with a sector-scale $r$, bearing the figures 1 to 8. The cover-plate $o$ has at its margin notches $s$ corresponding to the scale $r$ and serving as catches of a stop $t^1$, which is formed by the end of a screw $t$ provided with a milled head $t^2$. This screw $t$ is screwed in the carrier $c$ above the cylindrical bolt $d$ in such a way that its axis coincides with a tangent on a circle, assumed to be described about the axis $l$. The stage $n$ bears a uniform scale, corresponding to the scale $r$ and covered by the same in the drawing.

When in use, the microscope is placed with the feet $i$ and the edge of the base plate $f$, corresponding to the chord $f^3$, on a horizontal supporting surface while the observer takes his seat on the side of the carrier $c$. The tube $a$ is then inclined to the observer. After having removed the nut $q$ and lifted off the cover-plate $o$ the preparations to be examined are placed on the stage $n$ in such a way that one preparation lies at any one time within one of the sectors delimited by the scale $r$. Thereupon the cover-plate $o$ is refixed on the stage $n$ with the aid of the nut $q$, whereby care must be taken that the scales $r$ of the two plates $o$ and $n$ overlap each other at least approximately. It is now necessary to adjust the tube $a$ in a known way to the object-plane and to regulate the illumination by means of the mirror $h$, while the stop $t^1$ lies in one of the notches $s$.

The close examination of the microscopic preparation placed within one of the said sectors is effected in such a way that the observer, successively examines strips of the shape of the arc of a circle, whose radii always are of different length. For such reason, when viewing through the eyepiece $a^1$ he turns by hand the compressor $o$, $n$ around the axis $m$ in such a way that the stop $t^1$ gradually moves from one notch $s$ to the adjoining one. Thereupon, by rotating the milled head $t^2$ and the screw $t$, he displaces the stop $t^1$ by a small amount. Having done this, he turns the compressor $o$, $n$ in the opposite sense until the stop $t^1$ again has arrived at the first named notch $s$. By alternatively turning to and fro the compressor $o$, $n$ and by shifting the stop $t^1$ in unaltered direction, the observer by and by will have the whole surface of the sector presented to him in the field of view of the microscope. After one of the sectors has been searched, the operation should be repeated in the same way with the remaining sectors in so far as they contain microscopic preparations.

As may be seen, the microscope may be easily dismounted by loosening the nut $e$ and drawing forth the carrier $c$ under the piece of sheet-metal $g$. By then folding the feet $i$ against the base plate $f$, one obtains two single principal parts which may be conveniently pocketed.

I claim:

1. Microscope containing a stand, a microscope tube fitted on this stand, the stand having a plurality of points of support lying in a plane inclined at an oblique angle to the axis of the tube, a lever fixed on the stand, swivelling about an axis lying laterally of the axis of the tube, a circular glass plate fixed on this lever rotatable about its centre and having notches at its edge, a second circular glass plate, means for fixing this second glass plate on the first glass plate, and a displaceable stop fixed on the carrier and engaging in the said notches.

2. Microscope containing a base plate, a U-shaped body fixed on this base plate, a carrier having flattened parts at its lower end so as to fit with them into the U-shaped body, and projections below these flattened parts, a microscope tube fitted on the said carrier, a lever fixed on the said base plate swivelling about an axis lying laterally of the axis of the tube, a circular glass plate fixed on this lever rotatable about its centre, a second circular glass plate and means for fixing this second glass plate on the first glass plate.

HERMANN WINKEL.